United States Patent [19]

Eastwood

[11] 4,059,280
[45] Nov. 22, 1977

[54] SEAL RING ASSEMBLY
[75] Inventor: Brian Geoffrey Eastwood, Woking, England
[73] Assignee: Hall & Hall Limited, Hampton, England
[21] Appl. No.: 592,541
[22] Filed: July 2, 1975
[51] Int. Cl.² ............................................. F16J 15/24
[52] U.S. Cl. .................................. 277/188 A; 277/165
[58] Field of Search ................... 277/188, 188 A, 214, 277/231, 165, 166

[56] References Cited
U.S. PATENT DOCUMENTS

| 2,456,356 | 12/1948 | Aber | 277/188 A |
| 2,862,736 | 12/1958 | Russell | 277/188 A |
| 3,330,568 | 7/1967 | Wetzel | 277/231 |
| 3,583,712 | 6/1971 | Domros | 277/214 |
| 3,920,252 | 11/1975 | Dechavanne | 277/188 A |
| 3,930,657 | 1/1976 | Svensson | 277/188 A |

FOREIGN PATENT DOCUMENTS

| 267,946 | 6/1966 | Australia | 277/188 A |
| 1,193,987 | 5/1959 | France | 277/188 A |
| 1,289,558 | 9/1972 | United Kingdom | 277/188 A |

Primary Examiner—Robert I. Smith
Attorney, Agent, or Firm—Larson, Taylor and Hinds

[57] ABSTRACT

A sealing ring assembly consists of (i) a preferably unreinforced sealing ring (ii) a harder supporting ring adjacent an axial side of the sealing ring and having lips extending axially to overlap the sealing ring at both its radially outer and inner peripheries, the radially inner lip being axially shorter than the radially outer one, and (iii) a bearing ring separate from the supporting ring. In a double-acting assembly there are two rings (ii) and (iii) arranged successively and respectively at each axial side of the sealing ring.

10 Claims, 4 Drawing Figures

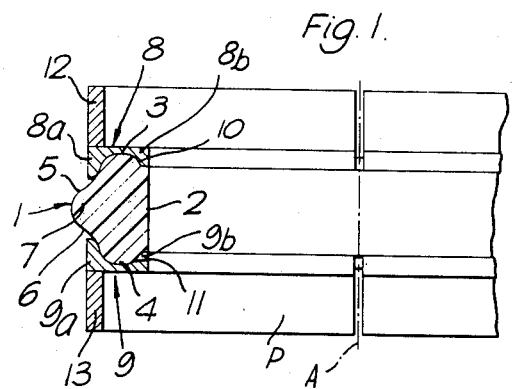
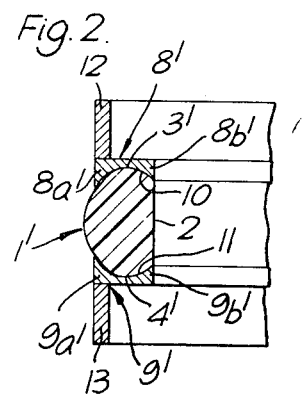
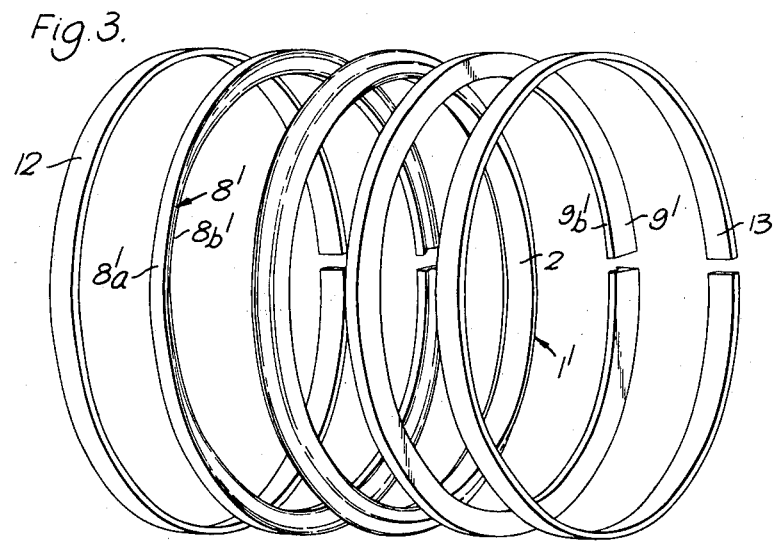
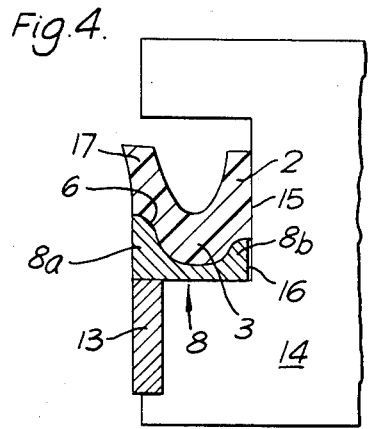

SEAL RING ASSEMBLY

FIELD OF THE INVENTION

This invention relates to seal ring assemblies which include a resilient sealing ring and one or more harder rings constraining and supporting the sealing ring. We are not concerned with all-metal sealing rings of the type which are used on pistons of internal combustion engines, but rather with the elastomeric sealing rings which ar used in for example hydraulic and pneumatic equipment.

BACKGROUND OF THE INVENTION

A problem is that the elastomeric nature of the sealing rings mounted around a piston in a cylinder together with the very high pressures which have to be sustained in these assemblies means that the elastomer may be extruded in the axial direction of the piston. Also, if its sealing effect is to be sufficient it has to be forced radially against the wall of the cylinder; against which it slides, hard enough in order to ensure an efficient seal. This means that there may be wear and rubbing at that wall so that the working surface of the sealing ring is rolled off as well as perhaps suffering extrusion.

It has been proposed to provide a seal ring assembly having an elastomeric sealing ring and also harder rings on each side in which there is interaction between the sealing ring and the harder ring in the sense that the sealing ring being elastomeric "energises" overhanging portions of harder rings which are placed on each axial side of it. This is an advantageous situation as it helps hold both the sealing and these harder rings from displacement and assists the bearing action of the harder rings.

However, these harder rings tend to lift radially outwardly in use and this can open up a gap under their radially inner edges into which material of the seal ring can enter: by lessening radially outward pressure on the harder rings this tendency, which can give rise to distortion and "nibbling" of the sealing ring, can be eliminated or lessened.

SUMMARY OF THE INVENTION

Starting from this position the invention provides a seal ring assembly including a resilient sealing ring one periphery of which includes a portion tapering from a working sealing surface towards one or both axial ends of the ring, a separate supporting ring being provided at said one end or, as the case may be, at each axial end of the bearing ring and having its radially inner and outer peripheries axially adjacent the radially inner and outer peripheries of the sealing ring, one of said peripheries of the or each supporting ring including a first lip overlying the tapered periphery portion of the sealing ring to protect the working sealing surface against extrusion or rolling and the other said periphery including a second lip extending axially less far than the first lip and adapted to exert a pressure tending to offset radially the radially directed pressure exerted by the sealing ring on the supporting ring.

The transition between the lips and the body of the supporting ring may be a smooth curve and the lips themselves may taper in radial cross-section axially away from the body of the ring, preferably to a point. The radially outer periphery of the first lip will usually by cylindrical, but it may be flared outwardly at least at its axial end closest to the working surface and the radially inner periphery of the first lip overhanging the sealing ring may correspondingly be turned relatively sharply outwardly at the same axial ends, again preferably coming to a point in radial cross-section.

A further preferred feature at least in the application of the assembly to sealing a piston, is that at least one separate bearing ring is provided next to the or each supporting ring axially at the side opposite that occupied by the sealing ring, to be interposed directly between the piston and cylinder in use, for preventing lateral movement of the piston.

In another aspect of the invention we provide a piston and cylinder assembly wherein the piston in the cylinder is provided with an annular groove in its surface containing a seal assembly consisting of the sealing ring and the supporting ring or rings as defined above positioned in the groove. If a bearing ring or rings is or are provided, each may be positioned in a groove which merges with the groove for the sealing and support rings. One advantage of the assembly is that it enables the sealing ring to be made of small radial thickness compared to its diameter and unreinforced because it is supported both axially and radially in its groove by the supporting ring or rings and thus the assembly positioned on the piston may include an unsplit elastomeric sealing ring even when the piston is one-piece piston. The supporting and bearing rings will usually be split.

The supporting rings may be made of any comparatively economic hard material. The bearing rings may be of comparatively small radial dimension in cross section and can be made of any desired material (the same as or different from that of the supporting rings).

DESCRIPTION OF DRAWINGS

Particular embodiments of the invention will now be described with reference to the accompanying drawings wherein:

FIGS. 1 and 2 are respectively radial cross-sectional views of two forms of double-acting ring assembly embodying the invention;

FIG. 3 is an exploded perspective view of the assembly of FIG. 2; and

FIG. 4 is a scrap section diametrically through a piston including a third embodiment of the invention, as a single-acting assembly, and drawn to a larger scale than FIGS. 1 and 2.

DESCRIPTION OF PARTICULAR EMBODIMENTS

The double-acting sealing ring assemblies shown in FIGS. 1 and 2 each have five ring elements which lie side by side along the axial direction of a piston P which has a central axis A. The middle ring element is a sealing ring 1 of suitable elastomeric material such as a highly abrasion-resistant nitrile rubber, preferably without reinforcement. It has a cylindrical inner peripheral base 2 and a pair of side walls 3 and 4 leading to surfaces 5,6 concave in section, which taper to the side walls from an axially central working surface defined by a slightly convexly rounded ridge 7. The ridge 7 is at the radially outermost periphery of the ring and will provide the working surface of the sealing ring; it is axially narrower than the base 2. A pair of harder supporting rings 8 and 9 lie one one each side of the elastomeric sealing ring. These rings 8 and 9 are made of, for example, acetal resin and have a radially outer cylindrical face which in use is substantially flush with the ridge 7 of the sealing ring and an inner base substantially flush with the base 2 of the latter ring. In the unassembled state the outer diameter of the ridge 7 will be greater than that of the rings 8, 9, since the sealing ring 1 is under radial compression in use. They have radially outer peripheral lips 8a, 9a, which closely overlie and restrain the taper surfaces 5,6, and radially inner peripheral lips 8b, 9b which overlie and restrain concavely radiused corners 10, 11 of the sealing ring between the sidewalls 3,4 and the base 2. These rings have a constraining function against the sealing ring, supporting the axial ends of the working surface 7 closely, at the same time being energised by the resilient elastomeric ring and holding it firmly against both radial and axial dislodgement. When the assemblies of FIGS. 1 and 2 are installed in piston grooves, the walls 3,4 are held radially between the lips 8a and 8b on one side and the lips 9a and 9b on the other side of the respective sealing rings. The function of the outer lips 8a,9a in supporting the working surface is similar to that of known anti-extrusion rings of tapered form (see for example our United Kingdom Pat. Spec. Nos. 1 316 841 and 1 316 842) but, whereas such rings tend to lift outwardly under the pressure exerted through the sealing ring, the inner lips 8b, 9b of this embodiment balance or partially counteract this. The rings 8,9 are shaped so that they are slightly radially compressed resiliently between the piston and a cylinder wall, when fitted into position. This ensures their constant contact with the sliding surfaces.

The supporting rings 8,9 shown in both FIGS. 1 and 2 have smooth curves at the transition of the inner and outer lips to the body of the rings, but the body in FIG. 1 is incurred, whereas that in FIG. 2 forms a continuously flat or concavely curved surface abutting against the radially inner surfaces of correspondingly shaped lips 8b',9b'. The radially innerlips 8b,8b',9b,9b' may therefore be concave at their radially inner most portions (8b',9b') and there may be asymptotic to the base 2; the radially innermost regions of the lips 8b,9b (FIG. 1), on the other hand, are convex in cross-section. Thus the cross-secton of the sealing ring in FIG. 2 is a simpler shape than in FIG. 1. In both embodiments the radially inner lips extend less far axially than the radially outer lips 8a,8a',9a'.

Thus far, the assembly consists of the elastomeric seal plus two supporting rings, whichmay also have a bearing function for the piston in the cylinder by bottoming in their grooves.

The bearing function of the assembly is however provided or primarily provided by a further pair of rings 12, 13 each having a simple rectangular cross section and adapted to lie axially against the radially outer portion of the mutually axially remote planar side faces of the rings 8,9,8',9'. The outerperiphery of the rings 12,13 is the same as that of the rings 8,9,8',9' and of the sealing ring when the latter is compressed in position, but the rings 12,13 are comparatively radially thin being for preference one half to one sixth of the radial thickness of the other rings of the assembly. The radially innermost cylindrical periphery of the supporting rings 8,9,8',9' may be normally clear of the bottom of the piston groove so that they are under less radial pressure than the bearing rings 12,13.

This feature is illustrated in FIG. 4, in which the bottom of a groove in a single-acting piston 14 is denoted 15. A radial gap 16 is seen between the ring 8 and the groove bottom 15. This is a single acting embodiment with a channel ring 17, supporting ring 8 and bearing ring 13. The forms of the latter two are the same as in FIG. 1 and like features of the rings in FIGS. 1 and 4 are denoted by like reference numerals. The ring 17 has a working flange, however, rather than the ridge-like working surface of the sealing rings of the double-acting assemblies.

By using separate supporting and bearing rings we widen the range from which choice of materials may be made for all the rings of the assembly since, firstly, the nature of the elastomer and of its supporting rings can be chosen with reference to each other and without having an eye to any bearing function in the latter rings (even though they may also have a bearing function as an added advantage) and since, secondly, the primary bearing function is due to the bearing rings and the nature of these rings may be selected for any particular location or intended use, the comparatively small bulk of these rings meaning that more expensive and higher quality material may be used in these than could have been used, for the same price, had there been a unitary construction of rings having both the supporting and bearing functions. However, the supporting and the bearing rings may all be made of the same material in some applications. Further, the separation of ring 13 from ring 9 and of ring 12 from ring 8 means that lateral displacement of the piston or of the seal is not necessarily communicated throughout the whole assembly, because there can be limited relative radial movement between rings 13 or 12 and the rest of the assembly.

All of the bearing and supporting rings of the doubleacting assemblies will usually be split for use on a one-piece piston but the sealing ring will be unsplit. To fit a seal assembly the piston is exposed from out of the end of its cylinder the sealing ring is stretched and fitted over the head of the piston until it fits into its groove and the split supporting and bearing rings are then fitted about it in the conventional way.

The materials described here are compatible with a wide range of mineral oils and water-soluble fluids. Other elastomeric materials can be used where non-inflammable fluids or higher temperatures are to be involved. The bearing rings are interchangeable with others to make assemblies of different duty capacities. Heavy duty bearing rings may be made, for example, of phosphor bronze or steel, while the supporting rings are still made of acetal resin or of material such as nylon.

Whilst the invention has been specifically described in its application to the sealing of pistons, it is equally applicable to the sealing of piston rods and like members which move axially — i.e. applications in which the dynamic working surface of the sealing ring is at its inner periphery.

I claim:
1. A seal ring assembly comprising
 a. a sealing ring which is an annulus about a central axis, the sealing ring
  i. having a radially inner and a radially outer periphery
  ii. having a working surface at one of the radially inner and radially outer peripheries
 b. a supporting ring which is an annulus about a central axis and of generally the same radius as the sealing ring, the supporting ring
  i. being harder than the sealing ring and
  ii. having a radially inner and a radially outer periphery and
  iii. having a lip extending axially in one axial direction at the radially inner periphery and
  iv. having a lip extending axially in the one axial direction at the radially outer periphery, the lip at the one of the radially inner and outer peripheries which corresponds to that periphery of the sealing ring which has the said working surface extending axially further than the other said lip, and v. being separate from the sealing ring; and c. a bearing ring separate from the supporting ring and being harder than the sealing ring and having one radial periphery of substantially the same radius as the periphery of the sealing ring which provides the working surface whereby the rings may be placed axially side by side in a seal ring assembly with the sealing ring adjacent to the supporting ring and the supporting ring adjacent the bearing ring, the sealing ring being overlapped and supported at its radially inner and outer peripheries by the lips of the supporting ring, the working surface being supported by the lip of greater axial extension.

2. A seal ring assembly as claimed in claim 1 wherein the working surface is at the radially outer periphery of the sealing ring, and the lip of greater axial extension is at the radially outer periphery of the supporting ring.

3. A seal ring assembly as claimed in claim 2 wherein a further said supporting and bearing ring are provided, the said supporting ring and further supporting ring being to lie axially adjacent respective axial side faces of the sealing ring.

4. A seal ring assembly as claimed in claim 1 wherein a further said supporting and bearing ring are provided, the said supporting ring and further supporting ring being to lie axially adjacent respective axial side faces of the sealing ring.

5. A seal ring assembly as claimed in claim 1 wherein the lip of the supporting ring of lesser axial extension is convex in cross-section.

6. A seal ring assembly as claimed in claim 1 wherein the lip of the supporting ring of lesser axial extension is concave in cross section.

7. A seal ring assembly as claimed in claim 1 wherein the rings are respectively of different materials.

8. A seal ring assembly as claimed in claim 1 wherein the sealing ring is a single acting ring and the assembly consists of the said three rings only.

9. In a seal ring assembly comprising a sealing ring, a separate support ring to be energized by the sealing ring and having a lip extending axially to the dynamic working surface of the sealing ring at one radial periphery thereof to protect it against extrusion and rolling, and a separate bearing ring, the improvement comprising a further lip projecting axially from the support ring to overlie the sealing ring at the other radial periphery thereof, the said further lip being of less axial length than the first-mentioned lip.

10. The improvement as claimed in claim 9 wherein the sealing ring is symmetrical about a mid-circumferential plane thereof, and mirror-image support rings and bearing rings are provided at each axial side of the sealing ring.

* * * * *